(12) United States Patent
Adolfsson et al.

(10) Patent No.: US 9,008,916 B2
(45) Date of Patent: Apr. 14, 2015

(54) METHOD AND SYSTEM FOR SEAT BELT RETRACTION SPEED CONTROL

(75) Inventors: Peter Adolfsson, Hisings Backa (SE); Gert Aldeborg, Uddevalla (SE)

(73) Assignee: Volvo Car Corporation, Gothenburg (SE)

( * ) Notice: Subject to any disclaimer, the term of this patent is extended or adjusted under 35 U.S.C. 154(b) by 168 days.

(21) Appl. No.: 13/406,894

(22) Filed: Feb. 28, 2012

(65) Prior Publication Data

US 2012/0221210 A1    Aug. 30, 2012

(30) Foreign Application Priority Data

Feb. 28, 2011   (EP) ..................................... 11156166

(51) Int. Cl.
*G05F 7/00* (2006.01)
*B60R 22/44* (2006.01)
*G06F 17/00* (2006.01)

(52) U.S. Cl.
CPC ........... *B60R 22/44* (2013.01); *B60R 2022/444* (2013.01); *B60R 2022/4466* (2013.01)

(58) Field of Classification Search
CPC   B60R 21/0132; B60R 21/015; B60R 21/013; B60R 21/0134; B60R 2021/015
USPC .......................................................... 701/45
See application file for complete search history.

(56) References Cited

U.S. PATENT DOCUMENTS

| | | | | |
|---|---|---|---|---|
| 4,234,210 A * | 11/1980 | McNally et al. | ............... | 280/804 |
| 4,427,163 A * | 1/1984 | Kondziola | ................... | 242/373 |
| 5,415,431 A * | 5/1995 | Omura | ........................... | 280/805 |
| 5,552,986 A * | 9/1996 | Omura et al. | .................... | 701/45 |
| 5,788,005 A * | 8/1998 | Arai | .......................... | 180/65.285 |
| 5,876,325 A * | 3/1999 | Mizuno et al. | ................. | 600/102 |
| 6,485,057 B1 * | 11/2002 | Midorikawa et al. | ......... | 280/807 |
| 6,626,463 B1 * | 9/2003 | Arima et al. | ................... | 280/806 |
| 2001/0004997 A1 * | 6/2001 | Yano et al. | .................. | 242/390.8 |
| 2002/0158162 A1 * | 10/2002 | Fujii et al. | ................... | 242/390.9 |
| 2002/0166916 A1 * | 11/2002 | Fujii et al. | ................... | 242/390.9 |
| 2003/0015864 A1 * | 1/2003 | Midorikawa et al. | ......... | 280/807 |
| 2003/0019674 A1 * | 1/2003 | Duan | ........................... | 180/65.3 |
| 2004/0021029 A1 * | 2/2004 | Eberle et al. | ................ | 242/390.9 |
| 2004/0251366 A1 * | 12/2004 | Hishon et al. | ............... | 242/390.8 |
| 2005/0082410 A1 * | 4/2005 | Tanaka et al. | ............... | 242/390.8 |
| 2005/0205330 A1 * | 9/2005 | Higashiyama | ................ | 180/268 |

(Continued)

FOREIGN PATENT DOCUMENTS

DE   3149573 A1   6/1983
EP   1293401 A2   3/2003

OTHER PUBLICATIONS

European Patent Office, European Search Report for corresponding European Patent Application No. 11156166.8 mailed Jul. 26, 2011.

*Primary Examiner* — Ian Jen
(74) *Attorney, Agent, or Firm* — Brooks Kushman P.C.

(57) ABSTRACT

A seat belt is wound around a spool and a spring biases the spool to rotate in a belt retraction direction. A sensor detects a retraction speed of the belt when the spool rotates in the belt retraction direction and generating a belt speed signal. An electrical drive unit receives the belt speed signal and applies a torque to the spool in a belt extension direction (opposite to the belt retraction direction) if the retraction speed exceeds a threshold value. The torque is of a magnitude sufficient to maintain the retraction speed below the threshold value. The electric motor and/or electrical control unit may be part of or otherwise integrated with a safety belt pre-tensioning system.

16 Claims, 2 Drawing Sheets

(56) References Cited

U.S. PATENT DOCUMENTS

| | | | |
|---|---|---|---|
| 2005/0230174 A1* | 10/2005 | Fukuda | 180/268 |
| 2006/0071537 A1* | 4/2006 | Tanaka et al. | 297/477 |
| 2006/0119091 A1* | 6/2006 | Takao et al. | 280/801.1 |
| 2007/0102915 A1* | 5/2007 | Odate | 280/806 |
| 2008/0054618 A1* | 3/2008 | Ishii | 280/807 |
| 2010/0121533 A1* | 5/2010 | Takao et al. | 701/45 |
| 2010/0123349 A1* | 5/2010 | Murakami | 297/476 |
| 2010/0185365 A1* | 7/2010 | Blaas et al. | 701/45 |
| 2013/0079994 A1* | 3/2013 | Bunker | 701/45 |

\* cited by examiner

METHOD AND SYSTEM FOR SEAT BELT RETRACTION SPEED CONTROL

CROSS-REFERENCE TO RELATED APPLICATIONS

This application claims foreign priority benefits under 35 U.S.C. §119(a)-(d) to EP 11156166.8, filed Feb. 28, 2011, the disclosure of which is hereby incorporated by reference in its entirety.

TECHNICAL FIELD

The present invention concerns seat belts used for any type of vehicle or transportation seat where a seat occupant is to be fastened by a seat belt. More particularly, the present invention relates to a method and a system for controlling the speed at which a seat belt is refracted.

BACKGROUND

In vehicles of today, a number of different safety systems are present. An example of such a safety system is the seat belt pre-tensioner. The main task of the seat belt pre-tensioner is, often by use of an electric motor, to tighten the seat belt in order to pull the occupant against the backrest of the vehicle seat, thereby reducing the risk of injury in the event of a collision. Further, the seat belt mechanism ensures that the applied seat belt rest firmly but comfortably against an occupant's body during normal driving circumstances. Reversible seat belt pre-tensioners are active safety systems, intended to be activated a number of times based on signals like the steering angle and the speed of the vehicle indicating dangerous driving situations and increased possibility of a crash. Such systems are often provided with a rotation sensor to monitor the seat belt webbing refraction speed.

When a seat belt is not in use, it is retracted or wound up properly around the belt reel or spool. After the occupant has un-latched the seat belt connector from the latch, a retractor retracts the webbing and the connector via, for example, a mechanical spring mechanism present in the refractor, until the webbing and the connector reach a fully refracted, stored position. The requirements on the retracting mechanism are to robustly, securely, and completely retract the webbing even if some interference or drag is encountered, i.e. the connector is leaning on the door sealing in the door opening, or in the case of environmental parameters like low temperature, or during any other circumstances interfering with the retracting procedure. Thus, to ensure proper functionality, such mechanisms usually apply a relatively large retraction or rewinding torque on the belt reel, resulting in a relatively high retraction speed.

A problem may arises at the end of the retraction procedure, namely that due to high refraction speed, the connector may strike against the vehicle interior trim and result in dents, marks, or other minor damage.

In is known to employ an electric motor used in a seat belt pre-pre-tensioner system to also retract the seat belt when it is not in use. In a known device, when release (unlatching) of the seat belt latch is detected, refraction of the seat belt starts with a constant magnitude of driving force applied by the motor to the seat belt spool. This system is an active system, totally depending on predetermined actions activated by predetermined steps and/or conditions. The seat belt retraction action is started by a signal, indicating release of the seat belt connector from the seat belt latch. Thereafter the electric motor starts the retraction of the seat belt with high speed, and then, when a specific point in time is reached, the speed of the electric motor is reduced.

A disadvantage of such an active pre-tensioning system is that it depends on signals generated by actions initiated by the user of the seat belt, and that the system always reacts in the same way when such signals are present. As is known from experience when it comes to the human mind, human beings are likely to not act exactly in the same way in one situation compared to another. Applied to the above described system, a problem may occur for example if a driver of a car releases the seat belt latch, then immediately changes her/his mind and wants to refasten the seat belt with the latch to drive away again. The motor-driven retraction action starts when the seat belt is released, and as a result the user may find him/herself pulling the belt against the force of the electric motor. A similar problem may occur if the user of a seat belt attempts to temporarily loosen the seat belt in order to, for example, reach something in the back seat or in the glove compartment, and simply wishes to refasten the seat belt directly after. Such situations may irritate the user, giving the user the impression of not being in control of his/her own seat belt, and may also cause damage to the electric motor or other parts of the retraction mechanism.

SUMMARY

According to a first embodiment, a method for controlling a retraction speed of a seat belt wound around a spool comprises applying, by means of a biasing arrangement such as a mechanical spring, a first torque rotating the spool in a belt retraction direction, monitoring the refraction speed of the seat belt, and if the retraction speed exceeds a predetermined threshold value, activating an electric motor to apply a second torque to the spool in the belt extension direction to limit the retraction speed.

In a further embodiment, the method further comprises monitoring the retraction speed by measuring a rotational speed of the spool.

In a further embodiment, the method further comprises detecting if the spool reaches a belt end position, and stopping the electric motor if the belt end position is reached.

In a further embodiment, the method further comprises monitoring if the refraction speed is approaching zero, and stopping the electric motor in response to the retraction speed approaching zero.

In another disclosed embodiment, apparatus for extending and retracting a seat belt comprises a spool around which the seat belt is wound, a spring biasing the spool in a belt retraction direction, a sensor detecting a refraction speed of the belt when the spool rotates in the belt retraction direction and generating a belt speed signal, and an electrical drive unit receiving the belt speed signal. The electrical drive unit applies a torque to the spool in a belt extension direction (opposite to the belt retraction direction) if the retraction speed exceeds a threshold value, the torque being of a magnitude sufficient to maintain the retraction speed below the threshold value.

In a further embodiment, the electrical drive unit is a portion of or otherwise integrated with a seat belt pre-tensioner safety system.

In another disclosed embodiment, apparatus for limiting a rotational speed of a seat belt spool biased by a spring mechanism to rotate in a belt retraction direction comprises a sensor detecting the rotational speed of the spool in a belt retraction direction, an electrical control unit receiving an indication of the rotational speed from the sensor, and an electric motor controlled by the electrical control unit to apply a torque to the spool counter to the belt retraction direction if the rotational speed exceeds a threshold value. The torque applied is sufficient to maintain the rotational speed below the threshold value.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
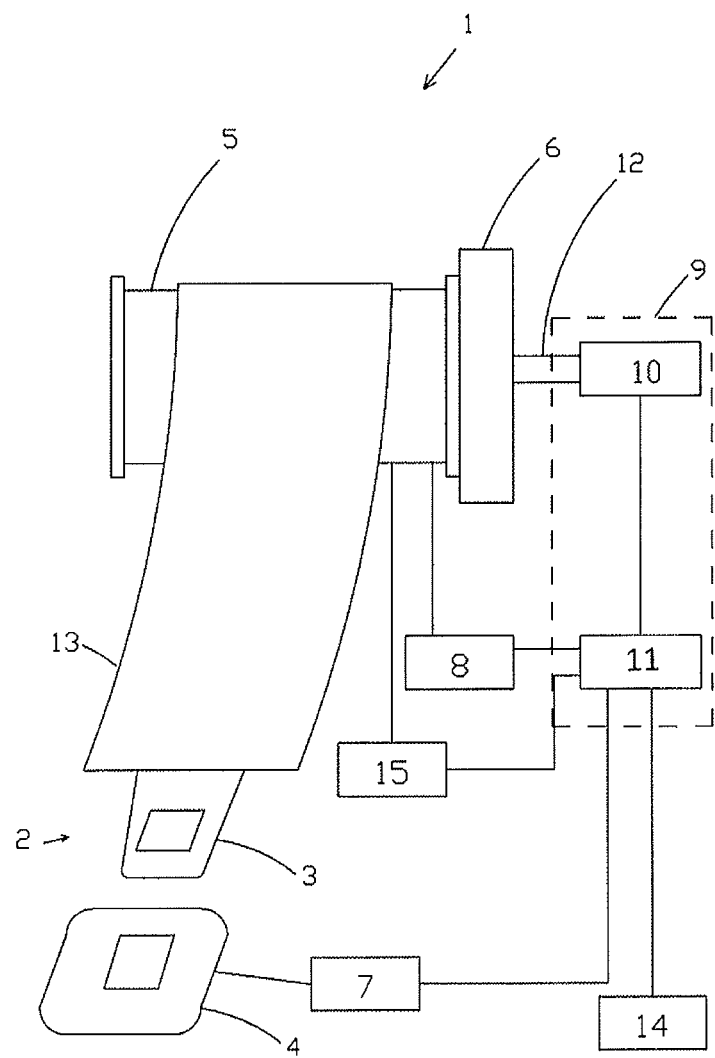
FIG. 1 is a schematic diagram of a seat belt retraction control system.

FIG. 1 illustrates a system 1 for seat belt retraction speed control. A seat belt 2 to be refracted comprises a flexible strap or webbing 13, and a connector 3 and a latch 4 for fastening the seat belt 2 when in use. A spool 5 for storing the belt webbing is arranged to rotate in a belt extension direction and in an opposite belt retraction direction. The system 1 further comprises a biasing arrangement 6 for biasing the spool 5 in the retraction direction for retracting the seat belt 2. The biasing arrangement 6 may be, for example, a mechanical spring mechanism. The biasing arrangement 6 is preferably arranged to apply torque in the winding or retraction direction when the seat belt webbing 13 is withdrawn from its storage position on the spool, and to be in a released state when the webbing is stored and not in use. The system 1 further comprises a latch condition sensor 7 indicating whether the connector 3 and the latch 4 are engaged with (latched) or disengaged from (unlatched) each other. Latch condition sensor 7 may be any suitable type of sensor, detecting disengagement of the parts involved.

The system 1 further comprises a sensing device 8 for registering the speed of refraction of the seat belt webbing 13. Such sensing device may be any suitable type of sensor capable of indicating the speed of the webbing, for example a device measuring the rotational speed of the spool. The sensing device 8 is arranged to detect if the speed exceeds a predetermined threshold value.

An electrical drive unit 9 controls the retraction speed of the webbing. Such drive unit 9 preferably comprises one or more electric motors controlled by an electrical control unit 11. The electric motor 10 may be coupled to the spool 5 via a shaft 12. Any other type of motion/torque transfer device may be used to connect the motor with the spool, such as a gear mechanism and/or a clutch. The control unit 11 monitors the belt retraction speed via the sensing device 8, and determines if the speed threshold value is exceeded. The sensing device 8, the motor 10 and the control unit 11 may be parts of (or otherwise integrated with) a safety system for seat belt pre-tension.

The electrical control unit 11 is arranged to receive an indication that the retraction procedure is complete and thus stop the motor. Such indication may be a signal from an end point sensor 15 sent to the control unit 11 indicating that an endpoint of the spool retraction is reached. Alternatively, indication may be that the speed of the webbing monitored by the control unit 11 is approaching zero. The motor may also be stopped after a predetermined period of time passed since the user disengaged the connector from the latch.

When in use, the system works as follows. When a user of the seat belt disengages the seat belt connector 3 from the latch 4, the biasing arrangement 6 rotates spool 5 to retract the seat belt webbing 13. A signal from the latch condition sensor 7 indicates disengagement of the seat belt 2. The electrical control unit 11 monitors the speed of the webbing via a sensing device 8 and indicates if a predetermined threshold value of the speed is exceeded. If the speed is exceeded, electrical control unit 11 activates the motor 10 and the motor applies toque to the spool in the belt extension direction sufficient to reduce the rotational speed of the spool 5.

Figure 2:
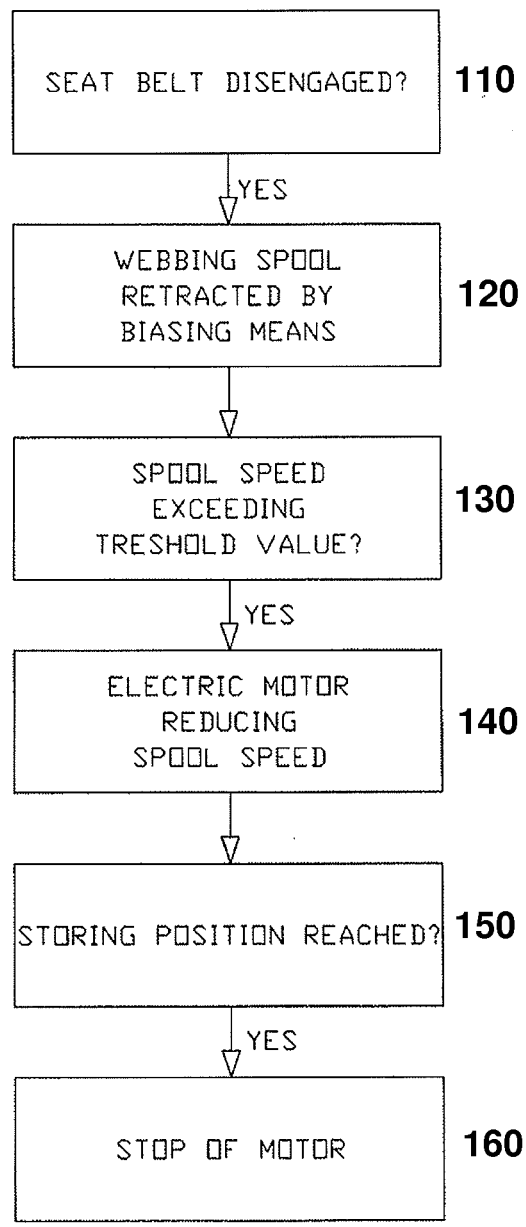
FIG. 2 is a flow chart showing a method for operating a seat belt retraction control system.

FIG. 2 is a flow chart showing an embodiment of a method for controlling the refraction speed of a seat belt. The retraction sequence begins when the user unfastens the seat belt, for example by disengaging the seat belt from a latch (block 110). The "unfastened" status of the seat belt may be determined by a latch condition sensor. A biasing arrangement, for example a spring-driven seat belt rewinding mechanism, has stored energy when the seat belt was extended prior to being fastened, and the biasing mechanism now applies the stored energy to a spool around which the seat belt is wound, thereby causing the spool to rotate in a belt retracting direction (block 120). Thus, the biasing arrangement immediately starts to retract the webbing of the seat belt when the seat belt is released from the latch.

The retraction speed of the seat belt webbing is monitored and compared with a predetermined threshold value (block 130). If the retraction speed exceeds the threshold value, the motor is activated to apply a torque to the spool in the belt extension direction as necessary to reduce the retraction speed to a level at or below the threshold value (block 140).

When it is detected that the belt has reached a fully retracted or "storing" position (block 150), the motor is stopped (block 160).

In the FIG. 1 apparatus, the seat belt retraction speed is registered by measuring the rotational speed of the seat belt spool. If the speed of the webbing exceeds the threshold value, the refraction speed is controlled by an electrical drive unit 9. The electrical drive unit preferably comprises at least one electric motor 10 controlled by an electrical control unit 11. The speed when controlled by the electrical drive unit 9 can be reduced to a more appropriate, limited value. The control unit 11 indicates that the speed of the spool 5 exceeds the threshold value. Further, the control unit preferably receives an indication that an end position where the webbing is fully stored is reached, thus, the retraction action is completed. The motor 10 is then stopped. Thereby, the motor 10 is protected from damage. The electric motor 10 may advantageously be the same motor as used in the seat belt pre-tension safety system.

The control unit 11 may further advantageously be the same as used in the seat belt pre-tension safety system, arranged to receive signals from a safety system controller 14, such as a restraints control module. To ensure proper functionality of the seat belt pre-tensioner, the motor 10 is operative to limit the rotational retraction speed in accordance with the present method when the seat belt is disengaged.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a retraction speed of a seat belt wound around a spool, the spool rotatable in a belt extension direction and in an opposite belt retraction direction, the method comprising:
    applying, by a retraction spring, a first torque rotating the spool in the belt retraction direction;
    detecting if a connector attached to the seat belt is engaged with a seat belt latch;
    monitoring a retraction speed of the seat belt caused by the retraction spring when the connector is disengaged from the seat belt latch; and
    if the retraction speed exceeds a predetermined non-zero threshold value, activating an electric motor to apply a second torque to the spool in the belt extension direction to limit the retraction speed to the threshold value.

2. The method according to claim 1 further comprising:
    monitoring an elapsed time since disengagement of the connector from the latch; and
    stopping the electric motor if the elapsed time exceeds a predetermined period of time.

3. The method according to claim 1, wherein the retraction speed is monitored by measuring a rotational speed of the spool.

4. The method according to claim 1 further comprising:
    detecting if the spool reaches a belt end position; and
    stopping the electric motor if the belt end position is reached.

5. The method according to claim 1 further comprising:
    monitoring if the retraction speed is approaching zero; and
    stopping the electric motor in response to the retraction speed approaching zero.

6. The method according to claim 1, wherein the electric motor is controlled by an electrical control unit receiving signals from a retraction speed sensor.

7. The method according to claim 6, wherein the electrical control unit comprises at least a portion of a seat belt pre-tensioner safety system.

8. Apparatus for extending and retracting a seat belt comprising:
    a spool around which the seat belt is wound, the spool rotatable in a belt extension direction and in an opposite belt retraction direction;
    a retraction spring biasing the spool in the belt retraction direction;
    a sensor detecting a retraction speed of the belt when the spool is rotated by the retraction spring in the belt retraction direction and generating a belt speed signal;
    a latch condition sensor detecting if a connector on the seat belt is engaged with a seat belt latch and generating a latch condition signal; and
    an electrical drive unit receiving the belt speed signal and the latch condition signal and applying a torque to the spool in the belt extension direction if the latch is disengaged and the retraction speed exceeds a non-zero threshold value, the torque sufficient to maintain the retraction speed below the threshold value.

9. The apparatus of claim 8 wherein the sensor further detects if the spool reaches a belt end position and the electrical drive unit stops rotation of the spool if the belt end position is reached.

10. The apparatus of claim 8, wherein the sensor measures a rotational speed of the spool.

11. The apparatus of claim 8, wherein the electrical drive unit is arranged to control the rotational speed of the spool.

12. The apparatus of claim 8, wherein the electrical drive unit comprises at least a portion of a seat belt pre-tensioner safety system.

13. The apparatus of claim 8, wherein the electrical drive unit comprises at least one electrical motor controlled by an electrical control unit.

14. Apparatus for limiting a rotational speed of a spool around which a seat belt is wound, the spool biased by a spring mechanism to rotate in a belt retraction direction, the apparatus comprising:
    a sensor detecting the rotational speed of the spool in the belt retraction direction caused by the spring mechanism;
    a latch condition sensor detecting if a connector on the seat belt is engaged with a seat belt latch and generating a latch condition signal;
    an electrical control unit receiving an indication of the rotational speed in the retraction direction caused by the spring mechanism from the sensor and the latch condition signal; and
    an electric motor controlled by the electrical control unit to apply a torque to the spool counter to the belt retraction direction if the rotational speed in the retraction direction exceeds a non-zero threshold value and the latch is disengaged, the torque sufficient to maintain the rotational speed in the retraction direction below the threshold value.

15. The apparatus of claim 14, wherein the electrical control unit comprises at least a portion of a seat belt pre-tensioner safety system.

16. The apparatus of claim 14 wherein the sensor further detects if the spool reaches a belt end position and the electrical control unit stops the motor if the belt end position is reached.

* * * * *